United States Patent [19]
Hunkar

[11] 3,936,713
[45] Feb. 3, 1976

[54] MACHINE CONTROL CIRCUIT
[75] Inventor: Denes B. Hunkar, Cincinnati, Ohio
[73] Assignee: Hunkar Laboratories, Inc., Cincinnati, Ohio
[22] Filed: Apr. 8, 1974
[21] Appl. No.: 458,470

[52] U.S. Cl. ................ 318/573; 264/40; 425/162; 425/141
[51] Int. Cl.² ........................................ G05B 19/24
[58] Field of Search ........... 318/573; 425/162, 451, 425/465, 141; 264/40

[56] References Cited
UNITED STATES PATENTS

| | | | |
|---|---|---|---|
| 2,784,452 | 3/1957 | Ruekberg et al. | 425/451 X |
| 2,994,812 | 8/1961 | Spencer et al. | 318/573 X |
| 3,019,481 | 2/1962 | Negoro | 425/465 X |
| 3,040,221 | 6/1962 | Fitzner | 318/573 |
| 3,368,241 | 2/1968 | Williams | 425/162 |
| 3,712,772 | 1/1973 | Hunker | 425/141 |
| 3,764,786 | 10/1973 | Vanter et al. | 318/573 X |
| 3,790,875 | 2/1974 | Claxton | 318/573 |

Primary Examiner—Robert K. Schaefer
Assistant Examiner—John J. Feldhaus
Attorney, Agent, or Firm—Wood, Herron & Evans

[57] ABSTRACT

A circuit for analog adjustment of a machine including a programming means to generate a fixed number of discrete control voltages. Each programmed control voltage corresponds to the desired machine control voltage at a particular moment of time in the cycle of the controlled machine. A staircase voltage is generated during the time period between two successive moments in the machine cycle, i.e., a machine cycle interval at which the control voltage is defined. The staircase voltage starts during each machine interval at the programmed control voltage corresponding to one moment of time in the machine cycle at the beginning of a particular machine cycle interval and ending, at the beginning of the next machine cycle interval, at the programmed control voltage for the moment of time corresponding to the beginning of the next machine cycle interval. The staircase voltage has a maximum step amplitude change that is small compared to the voltage difference between successive programmed control voltages so as to prevent undesirable step changes in the machine control voltage.

5 Claims, 3 Drawing Figures

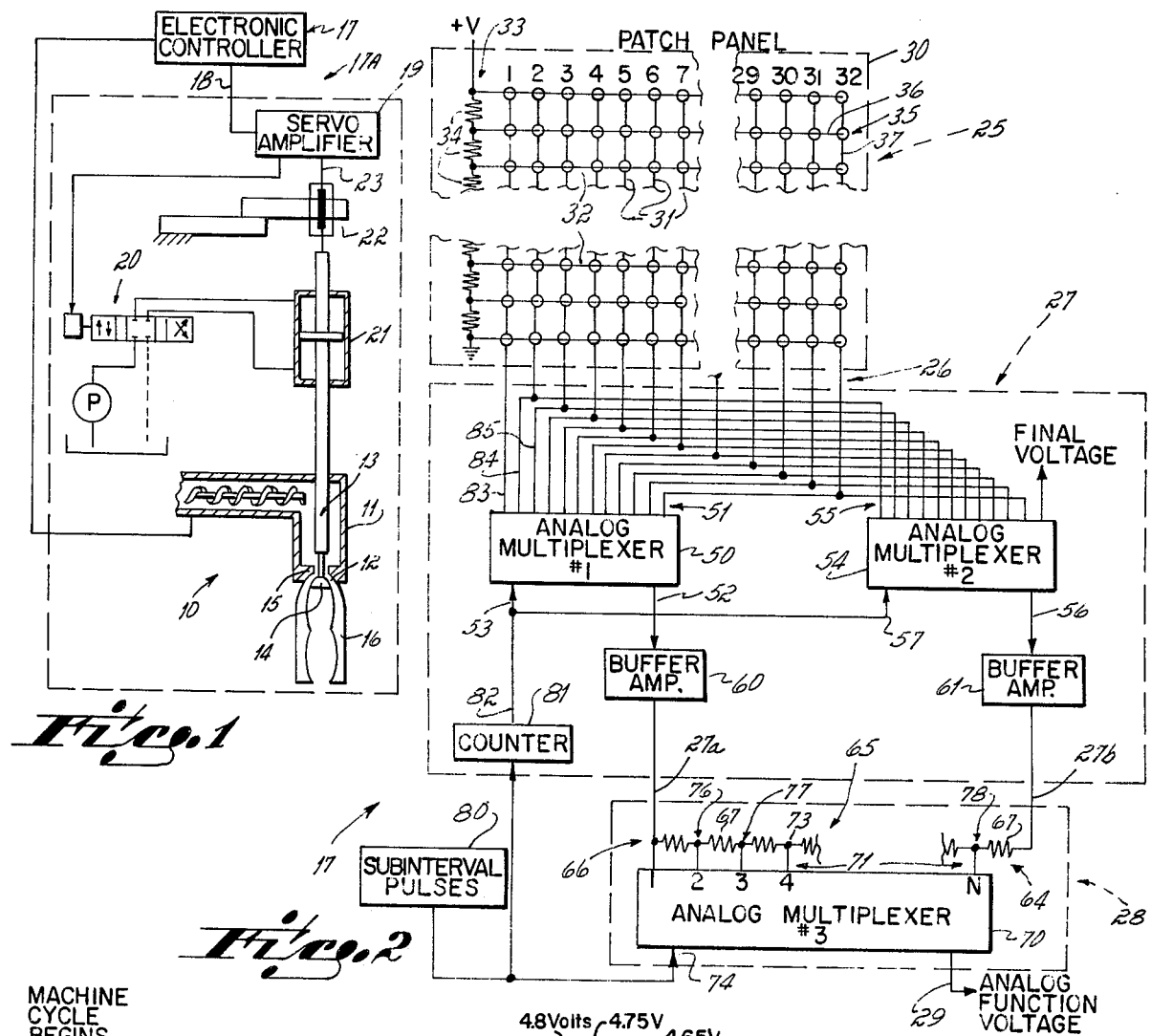
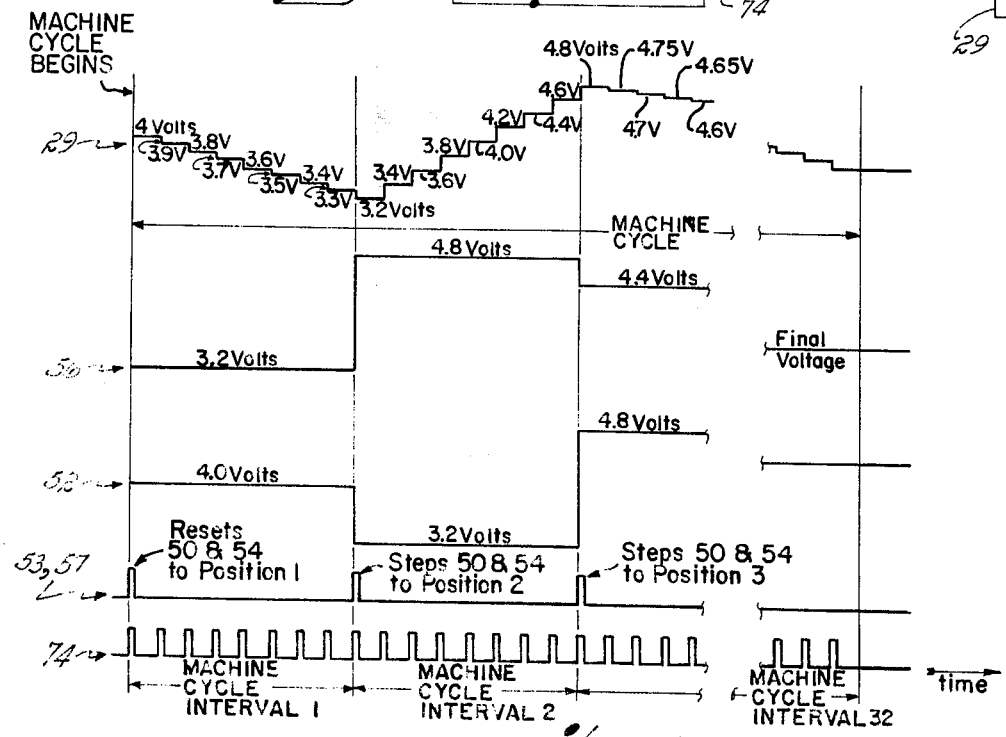

3,936,713

MACHINE CONTROL CIRCUIT

BACKGROUND OF THE INVENTION

This invention relates generally to the field of machine control and, more particularly to analog adjustment of machine operation during the machine cycle.

The invention is particularly adapted for use in controlling machines where the operation is varied many times during each machine cycle. For example, in parison extrusion machines utilized in blow molding processes, the parison tooling orifice is frequently changed during the extrusion cycle to vary the parison wall thickness along the length of the extruded tube. The extruded parison tube is then placed in a mold and expanded by gas pressure introduced into the tube to fit the mold shape. By varying the wall thickness along the length of the extruded parison tube, the tube can be expanded to fit the inner surface of the mold to produce a finished product with any desired wall thickness profile.

In order to control the tooling orifice of an extruder to vary the parison tube wall thickness, controllers of the type described in the Hunkar patent, U.S. Pat. No. 3,712,772 have been developed. The controller there described includes a matrix-type patchboard in which the desired parison wall thickness is programmed for each time interval of the extrusion cycle. The patchboard is periodically scanned by an electronic timing mechanism to accordingly adjust the extruder tooling orifice. By changing the tooling orifice, the parison wall thickness is varied during the extrusion cycle to produce a parison tube with the desired wall thickness profile along the tube length.

In the operation of parison extrusion machines, it has been found that large step-like changes in the tooling orifice are undesirable. When a large step change occurs in the tooling orifice during extrusion of a parison tube, a ring is produced in the parison tube which, after the tube has been expanded into the mold, produces a noticeable and unattractive ring in the finished product.

For other types of machines in which the operation is varied at intervals in the machine cycle, large step changes in the control voltage may give rise to undesirable machine operation. For example, a large step change may cause undesirable overshoot of the controlled mechanism. As such, the finished product may have an undesired appearance or other undesired feature.

While controllers of the type described in the above mentioned patent have been well accepted, it has been found that the extrusion cycle must be divided into a large number of sequential intervals in order to generate the analog control signals for controlling the tooling orifice at a fast enough rate so that the largest step change in control voltage is small to thereby avoid the problem associated with large step changes during the extrusion cycle. For typical parison extrusion applications, it has been found that as many as 256 program points are necessary in order to prevent the problems of step changes. For controllers of the type described in U.S. Pat. No. 3,712,772, such a large number of program points cannot be accommodated without significant design changes being made which add to the cost of the controller. Even if a controller were available with 256 programmable points, operator inconvenience occurs because 256 changes have to be made in the controller patchboard to change the parison profile from one application to another.

An alternative approach to solving the problem has been to utilize an RC type circuit to generate a varying control voltage during each machine cycle interval. Because the RC circuit uses a resistor/capacitor network, the analog output thereof follows a curve with a fixed time constant. Because the control function generated by the controller usually has both large and small control voltage changes from one machine cycle interval to another, an RC circuit with a fixed time constant cannot smoothly vary the control voltage during a fixed time interval for all such voltage steps encountered in a typical application. For example, an RC interpolator designed to smoothly change the voltage during a given time period between two different amplitudes will produce a step-like voltage change during a time period of the same length where the voltage difference between the two amplitudes is significantly smaller than the first two amplitudes. As such, the RC circuit does not produce a smooth control voltage function nor does it solve the problem of large voltage steps.

OBJECTS OF THE INVENTION

Therefore, in view of the foregoing difficulties, it is the primary objective of the invention to provide a circuit for generating an analog control voltage from a small fixed number of programmed points for controlling a machine during its machine cycle wherein the largest step change in control voltage is not large enough to cause undesirable machine operation.

In accordance with this objective, the invention is predicated on the concept of sampling two successive program points associated with the beginning of two successive machine cycle intervals and generating a staircase voltage during the first interval in which the maximum step change in the staircase is small enough to prevent undesirable machine operation.

In accordance with the preferred embodiment of the present invention, a patch panel of the type described in U.S. Pat. No. 3,712,772 provides a discrete number of programmed analog control voltages. Each of these analog control voltages is programmed on the patch panel and corresponds to the desired machine control voltage at the beginning of a specific interval in the machine cycle. The patch panel itself has as many program points as there are intervals in the machine cycle. In a preferred form of the invention, the patch panel includes 34 programmable points.

The patch panel is sampled by two different analog multiplexers with the output of the first multiplexer being equal to the control voltage from the patch panel for one machine cycle interval and the output of the second analog multiplexer being equal to the control voltage associated with the next machine cycle interval. The output of each analog multiplexer is applied to opposite ends of a ladder network having a plurality of intermediate connection points with voltages thereat which are intermediate the two control voltages.

A third analog multiplexer is connected to sample the intermediate connection points of the ladder network. The intermediate connection points are sampled at a speed greater than the interval or stepping rate at which the first and second multiplexers are stepped. As such, the output of the third analog multiplexer is a staircase voltage beginning at the analog control voltage selected by the first analog multiplexer at the beginning of each machine cycle interval and stepping upwardly or downwardly in equal steps toward the voltage at the output of the second analog multiplexer.

When the third analog multiplexer has completed the staircase voltage for a given interval in the machine cycle, the first and second analog multiplexers are stepped thereby changing the output to correspond to the analog control voltage associated with the beginning of the next two machine cycle intervals and the third analog multiplexer begins generating another staircase voltage associated with the next machine cycle interval. By providing a sufficient number of subintervals in each machine cycle interval and an equal number of intermediate connection points on the ladder network, the magnitude of voltage steps in the generated staircase voltage during any machine cycle interval is small enough so that the maximum step change of the control voltage generated thereby will not cause undesirable machine operation.

While the machine according to the present invention effectively eliminates the problem of large step changes in controlled voltage, a subsidiary advantage of the invention is that the desired control voltage during each machine cycle is generated by an apparatus having few program points on the patch panel so the circuit is less expensive than suitable prior art devices which perform the same function. Additionally, the invention is more convenient to use than suitable prior art devices since the patch panel utilized in the present invention is smaller than that required by prior art controllers capable of performing the same function.

DESCRIPTION OF THE DRAWINGS

The foregoing and other objects and advantages of the invention will become clearer from the following detailed description of a preferred embodiment of the invention taken in connection with the drawings which form a part of the original disclosure wherein:

FIG. 1 is a diagrammatic view of a parison extrusion machine incorporating a controller including the invention;

FIG. 2 is a block diagram of the electronic circuitry of the invention; and

FIG. 3 shows typical waveforms at different points in the circuit of FIG. 2.

DEFINITIONS

Machine Cycle: This term refers to the time required for the connected machine to perform the operation which is controlled by the invention. In parison extrusion machines, the term machine cycle refers to the time required for the machine to completely extrude a parison tube.

Machine Cycle Interval: This term refers to a period of time in the machine cycle and each machine cycle comprises a plurality of machine cycle intervals.

Machine Cycle Subinterval: This term refers to a period of time in a machine cycle interval and each machine cycle interval comprises a plurality of machine cycle subintervals.

Programmed Control Voltage: This term refers to a preset voltage or signal corresponding to the desired voltage for controlling the machine at a given moment of time in the machine cycle. The programmed control voltage is defined by a programming means and corresponds to the desired voltage at the beginning of a machine cycle interval.

GENERAL DESCRIPTION

Referring first to FIG. 1, a diagrammatic view of a parison extrusion machine is shown. For a detailed description of a machine of this type, reference is made to U.S. Pat. No. 3,712,772 which includes a more detailed discussion and the disclosure therein, in its entirety, is herein incorporated by reference.

The circuit of the present invention is particularly adapted for controlling parison extrusion machines although other fields of utility will undoubtedly occur to those skilled in the art.

FIG. 1 illustrates diagrammatically one form of a parison extruder, shown generally at 10. It is to be understood that the specific details of the parison extruder constitute no part of the present invention and the details included herewith are merely exemplary of one type of machine which may be utilized in connection with the invention. In general, the extruder 10 extrudes a quantity of heated plastic through an extruder head 11. The head 11 has a stationary die orifice 12 and a movable mandrel 13 including a core portion 14 which cooperates with a stationary die 15. The relative position of the movable core portion 14 with respect to the stationary die 15 controls the size of the die orifice 12 and, therefore, the wall thickness of the extruded parison tube 16.

After the parison tube 16 is extruded from the head, it is cut by a moving knife blade (not shown) and the cut parison tube is transported to a mold (not shown) consisting of two mold halves which completely encircle the tube. The tube, which is still soft, is subsequently expanded into contact with the inner surface of the mold by the introduction of gas under pressure into the interior of the tube. Again, the construction of the mold constitutes no part of the present invention. Details of one suitable form of extruding apparatus and molding apparatus are shown in Negoro, U.S. Pat. No. 3,019,481 for "Durable Orifice Extrusion Die," Ruekberg et al, U.S. Pat. No. 2,784,452 for "Vertical Machine With Radially Moving Molds for Forming Hollow Articles" and Williams, U.S. Pat. No. 3,368,241 for "Functionally Controlled Electro-Servo Variable Extrusion Apparatus".

It is to be understood that the present invention can be used with control systems for other types of extrusion apparatus, for example, apparatus of the type in which the mandrel remains stationary while the extruder head is shifted toward and away from the mandrel to vary the size of the die opening and, therefore, the thickness of the extruded tube wall. Additionally, the invention may be utilized in the control system for an extruder of the type having a transversely shiftable die so that the thickness of the wall can be varied asymmetrically, i.e., one side of the wall may be made thicker than the opposite side. The invention may also be utilized with any other form of extruder having controllable apparatus for varying the size of the tooling orifice through which the parison is extruded.

As shown diagrammatically in FIG. 1, an electronic controller, shown generally at 17, is provided to control the operation of the extruder system 17A so as to produce a parison tube 16 with the desired wall thickness profile. The controller 17 generates an analog control voltage at its output 18 which is utilized by a servo amplifier 19 to drive a servo valve mechanism shown generally at 20. The servo valve 20 controls the flow of pressurized fluid to a mandrel-shifting cylinder shown generally at 21. By changing the voltage amplitude at the output 18 of the electronic controller 17, the position of the mandrel 13 is varied to thereby control the die orifice 12 which, in turn, controls the wall thickness of the extruded parison tube 16.

A linear motion transducer (LVDT) 22 is connected to the mandrel 13 to generate an electrical feedback signal connected via the wire 23 to the servo amplifier 19. The feedback signal is utilized by the servo amplifier 19 to control the movement of the mandrel 13 so as to assure correct positioning thereof.

In the present invention, the electronic controller 17 generates the desired analog control voltage function at its output 18 for controlling the extruder 10 or other connected machine during the machine cycle. The controller 17 is shown in greater detail in FIG. 2 and includes a control voltage programmer shown within the dotted line 25. The programmer 25 has a plurality of output wires shown generally at 26, each output wire 26 has a DC voltage thereon which defines the machine control voltage which is desired to be applied by the controller 17 to the machine at a particular instant of time in the machine cycle.

The controller 17 includes a selector, shown within the dotted line 27, for sequentially selecting two successive outputs 26 of the programmer 25. Consequently, at any moment in time, the outputs 27a, 27b of the selector 27 corresponds to the control voltage for the connected machine desired at two different successive moments of time in the machine cycle. As hereinafter used, the term machine cycle interval corresponds to a length of time in the machine cycle between two different successive moments of time in the machine cycle.

The selector 27 includes means to change the voltages at the outputs 27a and 27b at the beginning of each machine cycle interval. As such, the output voltage at 27a for a particular moment of time corresponds to the desired control voltage for the connected machine at the beginning of the machine cycle interval in which the particular moment of time occurs. The voltage at 27b corresponds to the desired control voltage at the beginning of the next machine cycle interval.

The outputs 27a and 27b are connected to a staircase generator, shown within the dotted line 28. The staircase generator 28 generates a staircase voltage at its output 29 which starts at the beginning of each machine cycle interval at the voltage at 27a and steps in equal steps toward the voltage at 27b during the machine cycle interval. When the next machine cycle interval begins, the generator 28 produces a voltage step of the same magnitude as each step in the preceding machine cycle interval to set the output voltage at 29 to the voltage then appearing at 27a which was identically the voltage at 27b during the preceding machine cycle interval. As such, the voltage at the output 29 of the generator 28 is a staircase which makes a straight line approximation of the voltage function between the desired voltages defined by the programmer 25 for two moments of time occurring at the beginning of two successive machine cycle intervals.

DETAILED DESCRIPTION

In a preferred form of the invention as shown in greater detail in FIG. 2, the programmer 25 comprises a patch panel 30 capable of providing a plurality of discrete programmable voltages at the outputs 26. In the embodiment shown, the patch panel 30 includes 32 vertically arranged conductors 31 each of which comprises one output 26 of the programmer 25. The exact number of vertical conductors 31 is equal to the number of programmed points produced by the programmer 25 with one point being produced for each machine cycle interval. While 32 intervals are provided in the preferred embodiment, the exact number required for each application can vary from application to application.

The patch panel 30 also has a plurality of horizontally arranged conductors 32 which cross each of the vertically arranged conductors 31 without being connected thereto.

A ladder network, shown generally at 33, includes a plurality of series-connected resistors 34 connected between a voltage source +V and ground. The resistors 34 each preferably have the same resistance value so that the voltage across each resistor 34 is the same. Each horizontal wire 32 is connected at its leftmost end to a junction between two resistors 34 in the ladder 33. As such, each horizontal wire 32 is connected to a voltage source and the voltage difference between any adjacent pair of wires 32 is equal to the voltage difference between any other adjacent pair of wires 32.

The patch panel 30 includes means for interconnecting the vertical conductors 31 with the horizontal conductors 32. At a typical junction point shown generally at 35, a conductive pin interconnects a horizontal conductor 36 to a vertical conductor 37 so that the voltage on the horizontal conductor 36 is connected directly to the vertical conductor 37. In this manner, a predetermined or programmed control voltage is applied to the vertical conductor 37 which is utilized in a manner to be described later. By providing one pin to connect each vertical conductor 31 with one horizontal conductor 32, each of the vertical conductors 31 has a programmed control voltage thereon for controlling the operation of a machine during its machine cycle. As indicated above, each vertical wire 31 has a voltage thereon which equals the desired control voltage at the beginning of a specified machine cycle interval.

A patch panel of the type described in connection with FIG. 2 is described in greater detail in U.S. Pat. No. 3,712,772. It is understood that other conventional circuits such as power supplies may be used to produce the control voltages in place of the described patch panel.

A first analog multiplexer 50 with a plurality of inputs, shown generally at 51, has each input 51 electrically connected to only one of the vertical conductors 31 of the patch panel 30. The first analog multiplexer 50 is preferably an electronic switching mechanism which acts like a stepping switch to connect one and only one input 51 to the output 52 at any given moment in time. The first analog multiplexer 50 responds to pulses at the stepping pulse input 53 to change which vertical conductor 31 in the patch panel 30 is electrically connected to the output wire 52.

As indicated generally above, the patch panel 30 includes 32 vertical conductors 31 and, therefore, the first analog multiplexer 50 also has 32 discrete inputs. By providing stepping pulses at the input 53, at a rate of one pulse per machine cycle interval, the first analog multiplexer 50 successively connects each of the vertical wires 31 to the output 52 so that during successive machine cycle intervals, each of the programmed control voltages from the programmer 25 is connected to the output 52.

A second analog multiplexer 54 is also connected via a plurality of inputs shown generally at 55 to the vertical wires 31 of the patch panel 30. The second analog multiplexer 54, however, has its first input connected to the second vertical wire 31 of the patch panel 30. In a similar manner, each other input of the second analog multiplexer 54 is connected to the remaining vertical wires 31 of the patch panel 30.

The second analog multiplexer 54 is preferably identical to the multiplexer 50 and has an output 56 which is connected electrically to each input 55 in sequence in response to stepping pulses at the stepping pulse input 57. Since the second analog multiplexer 54 also has 32 inputs and the patch panel has only 32 vertical conductors 31, the thirty-second input to the second analog multiplexer 54 is connected to a fixed voltage indicated as a final voltage. This final voltage corresponds to the desired voltage at the output 27 at the end of the controlled machine cycle.

The analog multiplexers 50 and 54 are synchronized so that the first input of analog multiplexer 50 is connected electrically to the output 52 when the first input to the multiplexer 54 is connected to its output 56. As such, the program control voltage of the first vertical conductor 31 in the patch panel 30 is connected to the output 52 at the same time as the analog control voltage on the second vertical wire 31 is connected to the output 56. Additionally, the first and second multiplexers 50 and 54 are stepped together because their stepping pulse inputs 53 and 57 are electrically connected together. Therefore, when a stepping pulse occurs at the beginning of a machine cycle interval, the voltage previously appearing at 56 is switched to output 52 and the control voltage desired at the beginning of the next machine cycle interval appears at 56.

Each of the outputs 52 and 56 is connected to the input of a buffer amplifier circuit 60 and 61 respectively. Each of these buffer amplifiers 60 and 61 has a high input impedance and produces a voltage at its respective output 27a and 27b which is equal to the voltage at its input. The buffer amplifiers 60 and 61 are provided to prevent unnecessary loading of the patch panel 30.

The output 27b of the buffer amplifier 61 is connected, as shown generally at 64, to one end of a second ladder network shown generally at 65. The output 27a of the buffer amplifier 60 is connected as shown generally at 66 to the other end of the ladder network 65. The ladder network 65 itself comprises a plurality of series connected resistors 67 each having an identical resistance so as to produce at the intermediate connection points 73 between these resistors 67 a plurality of different voltages which lie between the program control voltages at the respective outputs of the multiplexers 50 and 54.

A third analog multiplexer 70 with a plurality of inputs, shown generally at 71, has each input 71 connected to one intermediate connection point 73 in the ladder network 65. The third analog multiplexer 70 responds to pulses at its input 74 to sequentially change the electrical connection between different inputs 71 and the output 29.

The third analog multiplexer 70 has a total of N inputs where N represents the total number of subintervals into which each machine cycle interval is divided. In one embodiment of the invention, N is 8 so that each machine cycle interval has 8 sub-intervals. In another embodiment, N is 16. The exact value of N is selected so that the amplitude of each staircase step is small enough to avoid the problems associated with larger steps. By increasing the value of N, the maximum step change of control voltage associated with a given programmed function is reduced and vice versa.

During each machine cycle interval, the third analog multiplexer 70 produces a staircase voltage at its output 29 such as shown in FIG. 3. During the first subinterval of a given machine cycle interval, the output voltage at 29 is identically equal to the voltage at the output 27a of the buffer amplifier 60. During the second subinterval in the same machine cycle interval, the analog multiplexer 70 connects its second input to its output 29 so that the voltage at the output 29 is identically equal to the voltage at the intermediate connection point 76 in the ladder network 65. During the third subinterval of the machine cycle interval, the intermediate connection point 77 is connected to the output 29. The voltage at the output 29 continues to change at the end of each subinterval until the Nth subinterval when the voltage is equal to the voltage at the point 78. As such, a staircase voltage with N steps is generated by the ladder 65 and the multiplexer 70 during each machine cycle interval.

As indicated above, the input 74 of the multiplexer 70 receives pulses at the subinterval rate which are generated by a subinterval pulse generator 80. This pulse generator 80 may be any type of pulse generator which produces the desired number of subinterval pulses during the time period of the machine cycle. For the preferred embodiment 256 pulses are generated thereby during the machine cycle. A counter 81 responds to the same subinterval pulses applied to the pulse input 74 of the third analog multiplexer 70 and generates a pulse at its output 82 for every N pulses at its input. The pulses at the output 82 are electrically connected to the stepping input 53 and 57 of the analog multiplexers 50 and 54 respectively. As such, for each N subinterval pulses received at the input to the counter 81, an interval pulse is generated at the output 82 for stepping the analog multiplexers 50 and 54 at the beginning of each machine cycle interval. As indicated earlier, the preferred value of N is 8 so that each machine cycle interval is divided into 8 subintervals.

OPERATION

The operation of the circuit is best illustrated by FIG. 3. It is assumed that plugs are inserted into the patch panel 30 to program the desired voltages for the controlled machine. Each such desired voltage corresponds to the control voltage at the beginning of each time interval in the machine cycle. The actual control voltage will vary from one application to another because different machines require different control voltages. The voltages specified below are merely illustrative of the circuit operation.

By way of example, it is assumed that the voltage at the first input wire 83 to the analog multiplexer 50 is 4.0 volts, the voltage at the second input wire 84 is 3.2 volts and the voltage at the third input wire 85 is 4.8 volts. Similarly, the voltage at the first three inputs of the second analog multiplexer 54 is 3.2 volts, 4.8 volts and 4.4 volts respectively. The remaining programmable points are set by inserting one pin into the patch panel 30 for each vertical wire 31.

It is assumed that the analog multiplexer 70 has eight inputs, i.e., the value of N is 8. As such, the counter 81 must produce a pulse at its output 82 after eight pulses have been received at its input.

At the outset of the controlled machine cycle, the subinterval pulse generator 80 begins to produce pulses as indicated in FIG. 3 at the point 74. The first subinterval pulse is operative to generate a pulse at the input 53 and 57 to reset the analog multiplexers 50 and 54 respectively to connect their respective first inputs to their respective outputs 52 and 56. As such, the voltage at the point 52 is 4.0 volts and the voltage at the point 56 is 3.2 volts.

The first subinterval pulse also is operative to reset the third analog multiplexer 70 to connect its first input to its output 29. Therefore, during the first machine cycle subinterval, the voltage at the output 29 is 4.0 volts because the voltage at the first input wire 83 is 4.0 volts.

When the next machine cycle subinterval pulse is received at the input 74, the output 29 is connected to the second input of the multiplexer 70. Since the voltage difference across the ladder network 65 is 0.8 volts and the ladder network 65 has eight resistors 67 each with equal resistance, the voltage at the point 76 is 3.9 volts and, therefore, the voltage at the output 29 is also 3.9 volts during the second machine cycle subinterval.

As further successive subinterval pulses are received at the input 74, the voltage at the output 29 decreases in 2.1 volt step until the voltage reaches 3.3 volts during the last subinterval of the first machine cycle interval.

The next subinterval pulse causes the multiplexers 50 and 54 to step at the beginning of the second machine cycle interval so as to connect their respective second inputs to their respective outputs 52 and 56. Consequently, during the second machine cycle interval, the voltage at the output 52 is 3.2 volts and the voltage at the output 56 is 4.8 volts. As such, the voltage across each of the resistors 67 of the ladder network 65 is 0.2 volts and each voltage step of the staircase voltage generated during the second machine cycle interval is also 0.2 volts.

The operation of the circuitry shown in FIG. 2 continues in the manner illustrated by FIG. 3 until all thirty-two machine cycle intervals have been completed. As such, 256 voltage steps are generated during the machine cycle from only 32 programmed voltages. After all of the 256 voltage steps have been generated, the subinterval pulse generator 80 ceases generating subinterval pulses until the beginning of the next machine cycle.

It will be readily appreciated that the foregoing illustrative example of the circuit operation will produce small step changes in the output control voltage at the subinterval rate. Since these step changes in the staircase voltage must be small to avoid the problems of large step changes in the machine control voltage function, the number of subintervals in each machine cycle interval may be different from application to application to avoid the problems of large step changes associated with each particular controlled machine. It is clear that an increase in the number N of subintervals in each machine cycle interval will cause a reduction in the maximum step change in the control voltage function and vice versa. Consequently, by selecting a large enough value for N for each application, the problems associated with large step changes in the control voltage function can be avoided. For many applications, a value of at least 8 for N has proved to provide very satisfactory control.

While the foregoing discussion places particular emphasis on a control system generating a control voltage at the output which is utilized directly by the controlled machine, it will be recognized by those of skill in the art that voltage scaling by amplifiers and the like may be utilized at numerous points in the circuit of the invention to scale the voltage thereat to produce the desired control voltage required by the machine. Additionally, it is clear that the principles of the invention can be utilized to generate a control current for machines which respond to current mode signals rather than voltage mode signals.

In addition to the foregoing modifications, the invention may be utilized to control the speed of a movable machine member such as the speed of a ram in an injection molding machine. Alternatively, the signals at the output of the circuit of the invention may also be utilized to control the direction of motion of a movable machine member such as a movable mold in a blow molding or similar machine. Indeed, the output signal of the invention can be utilized for almost any application where a predetermined analog signal as a function of time is needed.

While the foregoing description has been directed to a preferred embodiment and illustrative operation of the invention, it will be readily apparent to those skilled in the art that certain modifications in form only may be made without departing from the spirit and scope of the present invention as defined by the following claims.

What is claimed is:

1. A circuit for analog control of a machine during its machine cycle, comprising, in combination:

timing pulse generator for producing a plurality of timing pulses at equally spaced time intervals during the machine cycle;

a counter responsive to said timing pulse to produce a stepping pulse after a predetermined number of timing pulses are counted;

a control voltage programmer for generating a plurality of control voltages, each said control voltage corresponding to the desired control voltage for the machine at the beginning of a defined time interval of the machine cycle;

a first selector means responsive to said control voltage programmer and said counter for sequentially placing each of said plurality of control voltages on the first selector output in response to said stepping pulses;

a second selector means responsive to said control voltage programmer and said counter for sequentially placing each of said plurality of control voltages on the second selector output in response to said stepping pulses, said first selector means being operative to select the control voltage desired at the beginning of one time interval in the machine cycle while said second selector means being operative to select the desired control voltage at the beginning of the next time interval in the machine cycle;

a ladder network connected at one end to said first selector output and at its other end to said second selector output to produce a plurality of voltage outputs starting at the voltage at said first selector output and ending at the voltage at the output of said second selector;

a third selector means responsive to said ladder network and said timing pulses for selectively connecting in sequence the plurality of voltages from said ladder network to the third selector output in response to said timing pulses, the output of the third selector means being a staircase voltage during each machine cycle interval.

2. The circuit of claim 1 wherein said counter counts more than two timing pulses before producing a stepping pulse.

3. The circuit of claim 1 wherein said ladder network plurality of voltage outputs have equal voltage differences between all adjacent pairs of outputs.

4. The circuit of claim 2 wherein said ladder network has the same number of outputs as there are timing pulses counted by said counter before producing a stepping pulse.

5. A method of analog control of a parison extrusion machine with a variable extrusion die orifice comprising the steps of:

dividing the extrusion machine cycle into a plurality of machine cycle intervals, each machine cycle interval having a given time length;

generating a program control signal for each machine cycle interval, each program control signal being equal to the desired machine control signal at the beginning of the machine cycle interval for which the signal is generated;

generating a staircase signal during each machine cycle interval having a predetermined number of steps in the staircase signal, the staircase signal starting at the program control signal for the beginning of the machine cycle interval and ending, at the beginning of the next machine cycle interval, at the program control signal therefor;

connecting the staircase signal to vary the die orifice during the extrusion machine cycle to produce a parison extrusion having a varying wall thickness profile along its length;

adjusting the number of staircase steps during each machine cycle interval so that the maximum step change in the staircase signal during the extrusion machine cycle is small enough to prevent the formation of rings in the extruded parison.

* * * * *

UNITED STATES PATENT OFFICE
CERTIFICATE OF CORRECTION

PATENT NO. : 3,936,713
DATED : February 3, 1976
INVENTOR(S) : Denes B. Hunkar

It is certified that error appears in the above-identified patent and that said Letters Patent are hereby corrected as shown below:

Column 9, line 28: "2.1" should be --.1--.

Signed and Sealed this twentieth Day of April 1976

[SEAL]

Attest:

RUTH C. MASON
Attesting Officer

C. MARSHALL DANN
Commissioner of Patents and Trademarks